(12) United States Patent
Ogawa

(10) Patent No.: US 8,695,318 B2
(45) Date of Patent: Apr. 15, 2014

(54) METHOD AND SYSTEM FOR MANUFACTURING CABLE BEAD

(75) Inventor: Yuichirou Ogawa, Kodaira (JP)

(73) Assignee: Kabushiki Kaisha Bridgestone, Tokyo (JP)

( * ) Notice: Subject to any disclaimer, the term of this patent is extended or adjusted under 35 U.S.C. 154(b) by 43 days.

(21) Appl. No.: 13/527,238

(22) Filed: Jun. 19, 2012

(65) Prior Publication Data

US 2012/0324857 A1      Dec. 27, 2012

(30) Foreign Application Priority Data

Jun. 22, 2011   (JP) ................................ 2011-138826

(51) Int. Cl.
*B29D 30/48*       (2006.01)

(52) U.S. Cl.
USPC .................................................. 57/21; 57/11

(58) Field of Classification Search
USPC .............................. 57/11, 21, 201; 242/434.5
See application file for complete search history.

(56) References Cited

U.S. PATENT DOCUMENTS

| | | | | | |
|---|---|---|---|---|---|
| 1,570,821 | A | * | 1/1926 | Beyea ................................. | 57/21 |
| 3,966,131 | A | * | 6/1976 | LaBoda ...................... | 242/434.5 |
| 3,991,949 | A | * | 11/1976 | Ureshino ................... | 242/434.5 |
| 5,086,983 | A | * | 2/1992 | Darrieux ..................... | 242/434.5 |
| 8,080,120 | B2 | * | 12/2011 | Sano et al. ..................... | 156/136 |
| 2005/0145320 | A1 | * | 7/2005 | Niwa ............................ | 156/136 |
| 2008/0135156 | A1 | * | 6/2008 | Sano et al. .................... | 156/136 |

FOREIGN PATENT DOCUMENTS

| | | |
|---|---|---|
| EP | 0 340 102 A1 | 11/1989 |
| EP | 1 552 917 A1 | 7/2005 |
| EP | 1 798 023 A1 | 6/2007 |
| JP | A-07-68662 | 3/1995 |
| JP | A-2001-47169 | 2/2001 |
| JP | A-2006-181832 | 7/2006 |
| JP | A-2008-168612 | 7/2008 |
| JP | A-2008-195056 | 8/2008 |

OTHER PUBLICATIONS

Extended European Search Report issued in European Application No. 12 173 038.6 dated Oct. 4, 2012.

Nov. 14, 2013 European Search Report issued in European Patent Application No. 12173038.6.

* cited by examiner

*Primary Examiner* — Shaun R Hurley
(74) *Attorney, Agent, or Firm* — Oliff PLC

(57) ABSTRACT

A method and system for manufacturing high-quality cable beads with efficiency. The method includes the steps of arranging a plurality of carriages carrying a core and a reel wound with a wire around a reel revolving means having at least two arms, attaching the core to a core rotating means for rotating the core in a circumferential direction by holding it with one of the arms and positioning the reel on one side of the core by holding it with the other of the arms, manufacturing a cable bead by revolving the reel by holding it alternately with each of the two arms, and returning the cable bead and the reel to the carriage using the two arms. Thus, the setting of the reel and the core, the manufacturing of a cable bead, and the returning of the cable bead and the reel back to the carriage are performed automatically.

5 Claims, 8 Drawing Sheets

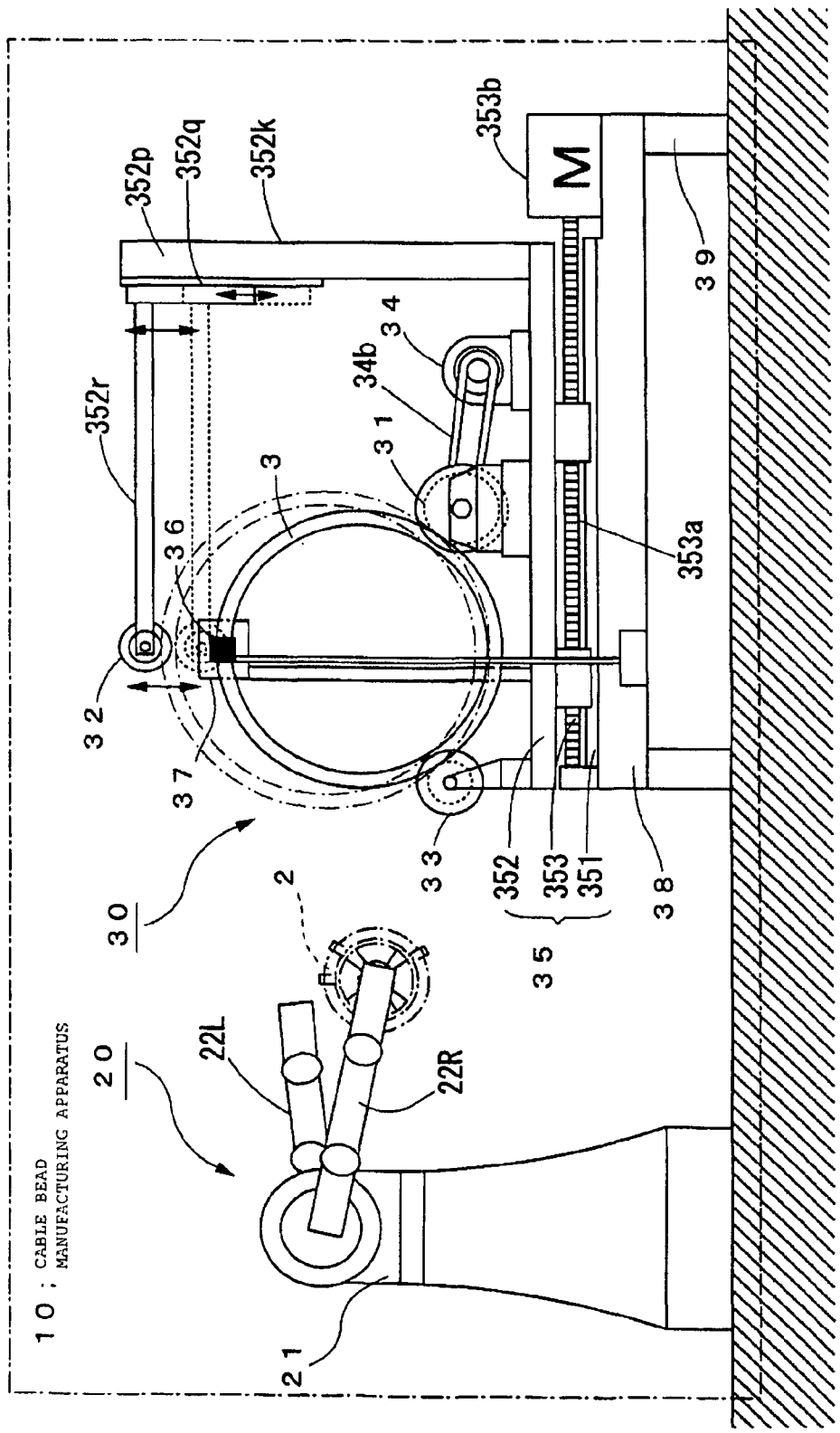

FIG. 11
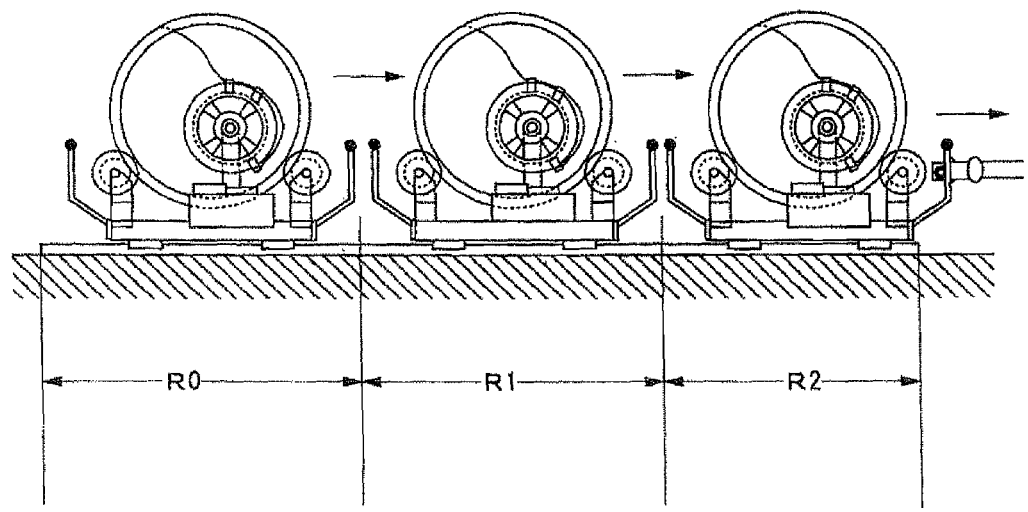
FIG.12(A) PRIOR ART       FIG.12(B) PRIOR ART
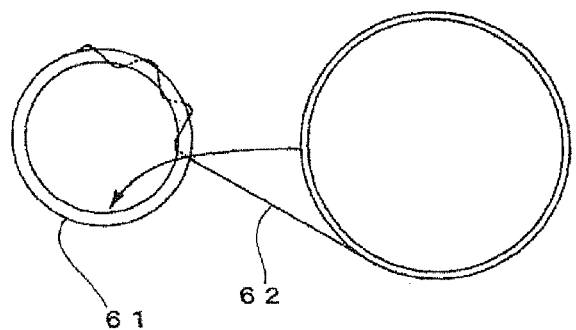     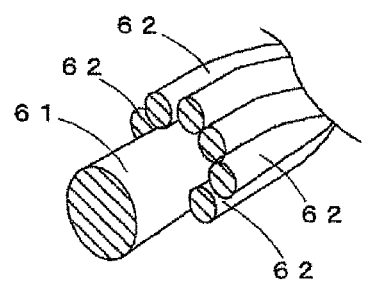

METHOD AND SYSTEM FOR MANUFACTURING CABLE BEAD

CROSS-REFERENCES TO RELATED APPLICATIONS

The present application is based on Japanese Priority Application No. 2011-138826 filed on Jun. 22, 2011 with the Japanese Patent Office, the entire contents of which are hereby incorporated by reference.

BACKGROUND OF THE INVENTION

1. Field of the Invention

The present invention relates to a method and system for manufacturing a cable bead which is an annular core with a wire helically (spirally) wound therearound. The cable bead is embedded in the bead portion of a tire.

2. Description of the Related Art

A cable bead, as shown in FIGS. 12A and 12B, is a ring-shaped (annular) core 61 with a wire 62, whose diameter is smaller than that of the core 61, helically (spirally) wound therearound. The wire 62 is wound around the annular core 61 by repeating the action of passing the wire 62 from the outside through the inside of the ring of the core 61 and then pulling the wire 62 to the outside of the core 61 as disclosed in Japanese Unexamined Patent Application Publication No. 7-68662, for instance.

In another method for winding a wire around the annular core, a reel is moved in swing motions in planes parallel to the annular core while the annular core is rotated in a circumferential direction. At one end of the swing motion, the reel is traversed inside the ring of the annular core, and at the other end of the swing motion, the reel is traversed outside the ring of the annular core. Thus, by repeating these motions, the wire is wound around the annular core as disclosed in Japanese Unexamined Patent Application Publication No. 2008-168612, for instance. This method is believed to accomplish the manufacture of a cable bead with excellent winding of the wire in swift operation.

In another method, as proposed in Japanese Unexamined Patent Application Publication No. 2001-47169, an end of a wire is temporarily secured to an annular core by a chucking mechanism, and the wire is wound helically around the annular core, with the reel revolving through the inside and the outside the annular core as the core is rotated in a circumferential direction. In this method, before the end of the wire temporarily secured to the annular core intersects with the revolving position of the reel, the chucking mechanism is separated from the annular core. Hence, interference between the chucking mechanism and the reel is prevented from occurring, and the revolution of the reel continues. This method allows easy alternation of S winding and Z winding in multiple layers. And it accomplishes the manufacture of high-quality cable beads without such problems as tangling and twisting of the wire.

As is well known in the art, the annular core and the reel normally come in a set. Therefore, the manufacture of a cable bead may be carried out with great efficiency if a plurality of core and reel combinations are prepared in advance and supplied to the machine sequentially.

Yet, according to the above-cited three patent documents, the annular core and the reel are prepared separately, and, moreover, the setting of the annular core, the unloading of the cable bead, and the replacement of reels are all done manually.

Also, the machine disclosed in the second and third patent documents above have a structure such that it is not easy to carry out the replacement of the annular core and the reel which are to be supplied to the machine, and the exchanging of the reels.

The present invention has been made to solve the above-described problems, and an object thereof is to provide a method and a system for manufacturing high-quality cable beads with efficiency, which feature easy replacement of annular cores and reels supplied to the system.

SUMMARY OF THE INVENTION

A first aspect of the present invention provides a method for manufacturing a cable bead by winding a wire helically around an annular core. In the method, a plurality of carriages, each carrying an annular core and a reel wound with a wire, are first arranged around a reel revolving unit. The reel revolving unit is configured to revolve the reel using at least two arms thereof. Then the core is held with one of the arms and the core is set on a core rotating unit, which is disposed near the reel revolving unit to rotate the core in a circumferential direction, and the reel is held with the other of the arms and the reel is positioned on one side of the core set on the core rotating unit. Then a cable bead is manufactured by winding the wire helically around the core, with the reel revolved as it is held alternately by each of the at least two arms and the core rotated circumferentially in association with the revolution of the reel. Finally the manufactured cable bead is held with an arm not holding the reel, and the cable bead and the reel are held by the two arms respectively and returned to the carriage.

Thus, the setting of the reel and the core, the manufacturing of a cable bead, and the returning of the cable bead and the reel can be performed automatically. Also, the reliable revolving motion of the reel through the inside and outside of the core accomplishes an efficient manufacture of a cable bead featuring high quality and high reliability.

A third aspect of the invention provides a system for manufacturing a cable bead applying methods as described above. The system includes a plurality of carriages, each carrying an annular core and a reel wound with a wire and a cable bead manufacturing apparatus for manufacturing a cable bead by winding the wire helically around the core, with the core rotated circumferentially in association with the revolution of the reel. The cable bead manufacturing apparatus includes a core rotating unit for rotating the core in a circumferential direction, and a reel revolving unit for revolving the reel through the inside and the outside of the core set on the core rotating unit by holding the reel alternately from one side and the other side of the core. The reel revolving unit includes at least a first arm disposed on one side of the core to hold the reel on the side farther from the core plane and swing the reel to the other side of the core and a second arm disposed on the other side of the core to hold the reel on the side farther from the core plane and swing the reel to the one side of the core. Each of the arms includes a body, a first movable member rotatably connected to the body, a second movable member rotatably connected to the first movable member, and a holding member rotatably connected to the second movable member to hold the reel.

Thus, the setting of the reel and the core, the manufacturing of a cable bead, and the returning of the cable bead and the reel can be performed automatically. This also leads to the structuring of a cable bead manufacturing system capable of efficiently manufacturing high-quality and high-reliability cable beads.

It is to be understood that the foregoing summary of the invention does not necessarily recite all the features essential to the invention, and subcombinations of all these features are intended to be included in the invention.

BRIEF DESCRIPTION OF THE DRAWINGS

FIG. 2 is an illustration showing a cable bead manufacturing apparatus in accordance with an embodiment of the present invention.

FIG. 11 is an illustration showing another arrangement of a carriage and rails.

FIGS. 12(A) and 12(B) are illustrations showing a conventional method of manufacturing a cable bead.

DESCRIPTION OF THE PREFERRED EMBODIMENTS

The invention will now be described based on preferred embodiments which do not intend to limit the scope of the claims of the present invention but exemplify the invention. All of the features and the combinations thereof described in the embodiments are not necessarily essential to the invention.

Figure 1A:
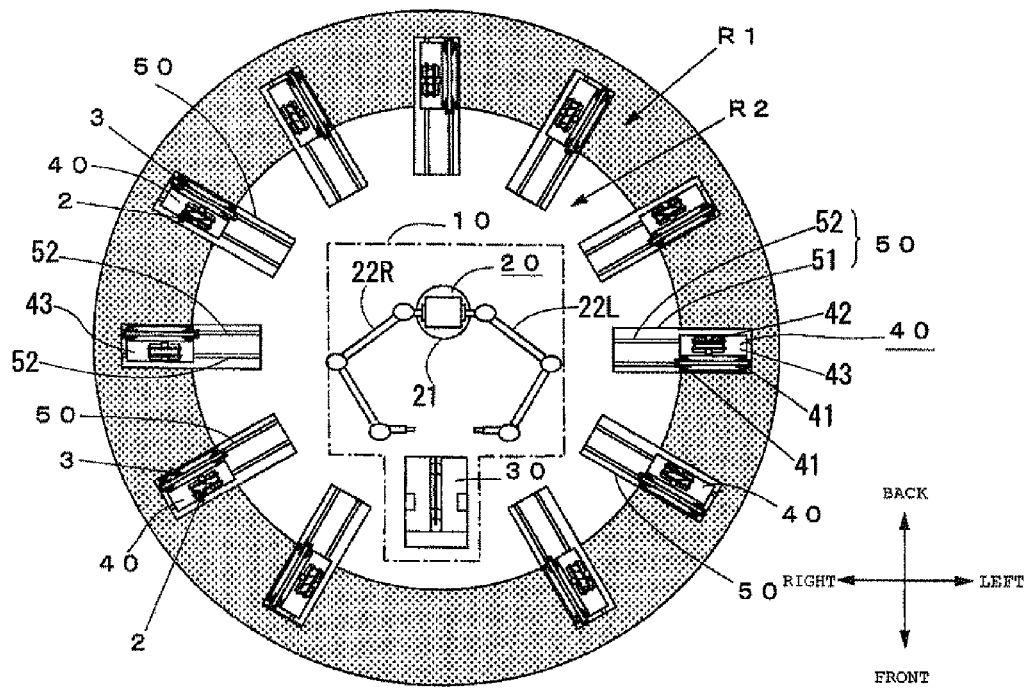
FIGS. 1(A) and 1(B) are illustrations showing a system for manufacturing a cable bead in accordance with an embodiment of the present invention.
Figure 1B:
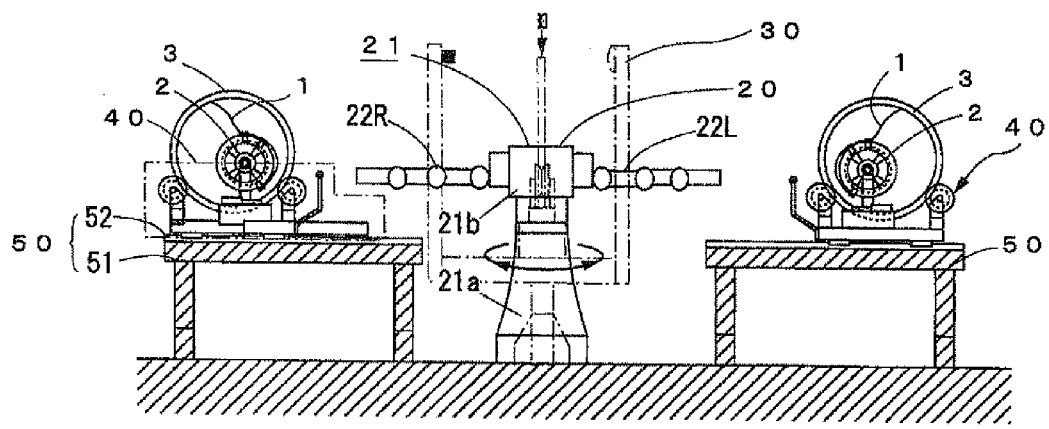
Figure 3:
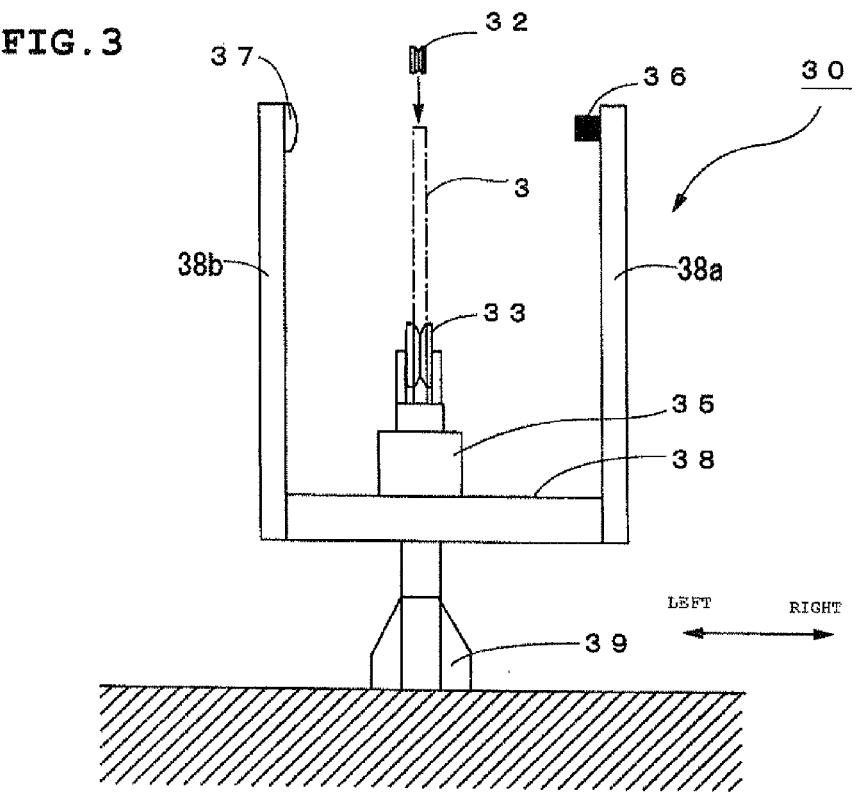
FIG. 3 is an elevational view of a core moving unit 30.

FIG. 1 illustrates a system for manufacturing a cable bead according to the present invention. FIG. 2 illustrates a cable bead manufacturing apparatus 10. FIG. 3 is an elevational view of a core moving unit 30.

As shown in those figures, the cable bead manufacturing apparatus 10, which includes a dual-arm robot 20 as a reel revolving unit and a core moving unit 30, winds a wire 1 led out from a reel 2 helically (spirally) around an annular core (hereinafter referred to as "core") 3 by revolving the reel 2, wound with the wire 1, through the inside and the outside the core 3. Each of carriages 40 is used to carry a reel 2 and a core 3, which are both articles to be supplied to the system, and also carry back a cable bead manufactured by the cable bead manufacturing apparatus 10 and the reel 2 after the winding. Each of supply stands 50 has a rail base 51 and rails 52 mounted on the rail base 51. The carriage 40 is mounted on the rail base 51.

The dual-arm robot 20, which includes a body 21 and first and second arms 22R and 22L, performs the setting of the core 3 and the reel 2 and the revolution of the reel 2.

The core moving unit 30, which performs the rotation and translational movement of the core 3, includes a drive roll 31, a holddown roll 32, a support roll 33, a drive unit 34, a core slide unit 35, a winding position detecting sensor 36, an illuminator 37, and a base 38.

A core rotating unit is constituted by the drive roll 31, the holddown roll 32, the support roll 33, and the drive unit 34. Note that the base 38 is supported by legs 39.

In a preferred embodiment of the invention, the drive roll 31 and the support roll 33 are disposed in the same horizontal plane, and they support a core 3 upright from below such that the core plane, which is the plane of the ring of the core 3, is perpendicular to the horizontal plane. The holddown roll 32 is disposed in a position above the core 3 so as to hold down the core 3 from above.

The supply stands 50, as shown in FIG. 1, are disposed substantially in a radial manner around the cable bead manufacturing apparatus 40. It should be noted that there is no supply stand 50 disposed on the side of the core moving unit 30 farther from the dual-arm robot 20 which performs the fetching and returning of the reel 2 and the core 3.

Hereinafter the area in which the first and second arms 22R, 22L of the dual-arm robot 20 can hold the reel 2 and the core 3 carried by the carriage 40 will be referred to as the fetching region R2, and the area outside the fetching region R2 as the standby region R1. The standby region R1 is the region where the worker can enter for necessary operation, whereas the fetching region R2 is the area the worker is forbidden to enter.

Also, as used herein, the term "forward" or "front" refers to the direction of the core moving unit 30 as seen from the body 21 of the dual-arm robot 20, and the terms "right side" and "left side" refer to the side of the first arm 22R and the side of the second arm 22L, respectively, when the first and second arms 22R, 22L are on the side of the core moving unit 30. On the core moving unit 30, therefore, the term "forward" or "front" refers to the direction of the drive roll 31 as seen from the support roll 33.

On the core moving unit 30, as shown in FIG. 3, the winding position detecting sensor 36 is disposed to the right side of the core slide unit 35, and the illuminator 37 to the left side thereof.

Figure 4A:
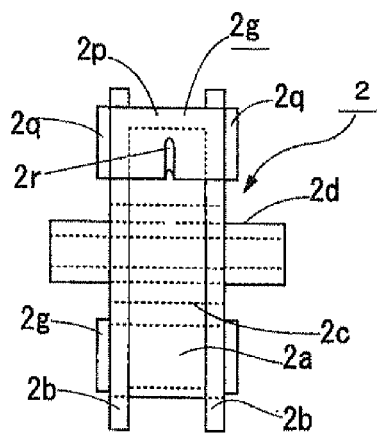
FIGS. 4(A) and 4(B) are illustrations showing an example of a structure of a reel in accordance with an embodiment of the present invention.
Figure 4B:
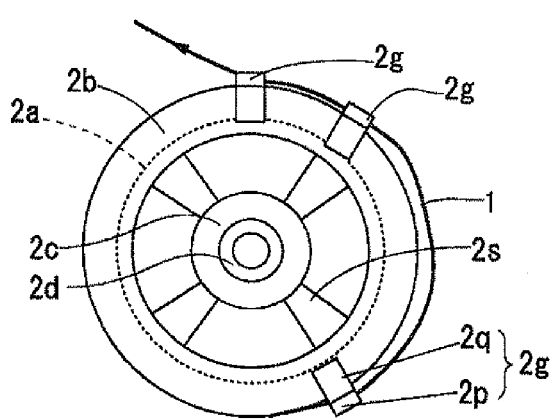

As shown in FIGS. 4A and 4B, the reel 2 includes a cylinder 2a, which comes with a wire 1 wound around it, a pair of flanges 2b, which are disposed on either side of the cylinder 2a, a hub 2c, which serves as the core of the reel, a shaft member 2d, which is a hollow cylinder fitted inside the hub 2c and protruding from the ends of the hub 2c, a plurality of wire guides 2g, and a not-shown braking mechanism. The flanges 2b and the hub 2c are coupled to each other via a plurality of spokes 2s, and the hub 2c and the shaft member 2d are coupled to each other via a not-shown bearing. That is, when the shaft member 2d is fixed, the reel 2 according to the present embodiment rotates with the shaft member 2d as the axis of rotation.

Also, each of wire guides 2g includes a horizontal piece 2p, which is disposed in a bridging manner on the outside of the flanges 2b, and attaching pieces 2q, which are connected to the ends of the horizontal piece and attached to the peripheral portions of the flanges 2b. Provided in a substantially middle portion of the horizontal piece 2p is a guide groove 2r for guiding the wire 1 led out from the reel 2.

Figure 5A:
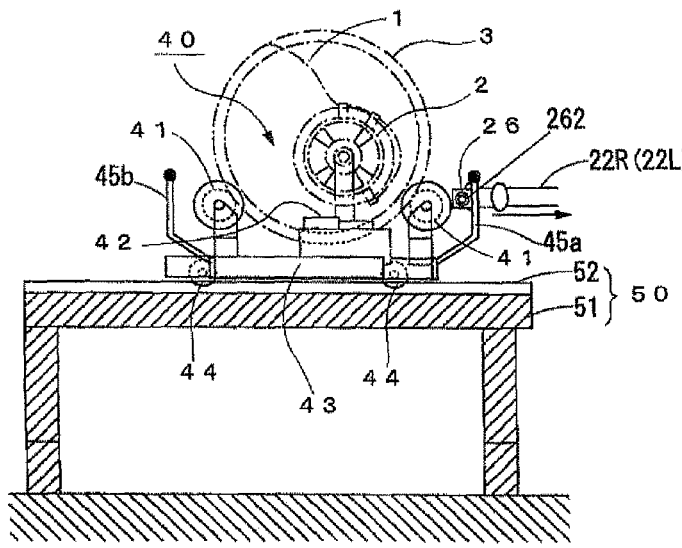
FIGS. 5(A), 5(B), and 5(C) are illustrations showing an example of a carriage and rails in accordance with an embodiment of the present invention.
Figure 5B:
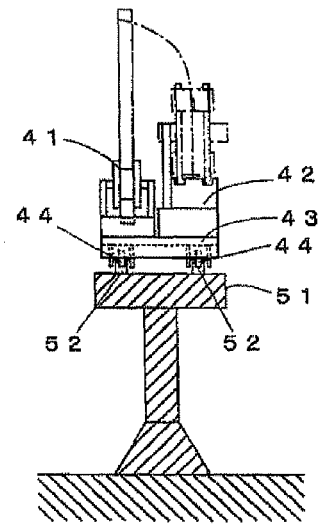
Figure 5C:
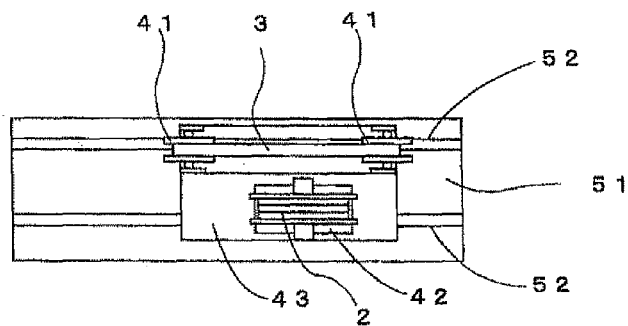

The carriage 40, as shown in FIGS. 5A to 5C, includes two support rollers 41, which support the lower part of the core 3 at two spaced-apart points, a reel support base 42, which supports the reel 2 from below, a sliding member 43, which slides along rails 52 carrying the support rollers 41 and the reel support base 42, wheels 44, which are provided on the rail 52 side of the sliding member 43, and handles 45a, 45b, which are installed upright on the forward side (dual-arm robot 20 side) of the skidding member 43 and the backward side thereof, respectively.

The wheels 44 are rotatably fitted on the sliding member 43. Therefore, the carriage 40 can be smoothly moved along the rails 52 by pulling or pushing the handle 45a or 45b.

Figure 6A:
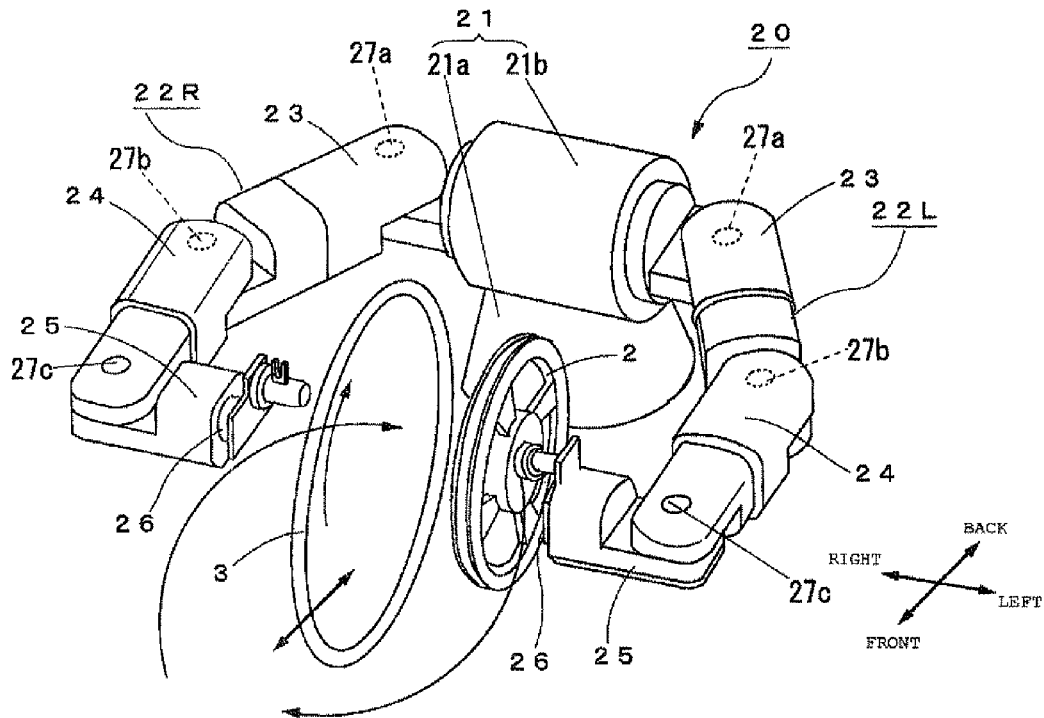
FIGS. 6(A) and 6(B) are perspective views showing a structure of a reel revolving unit.
Figure 6B:
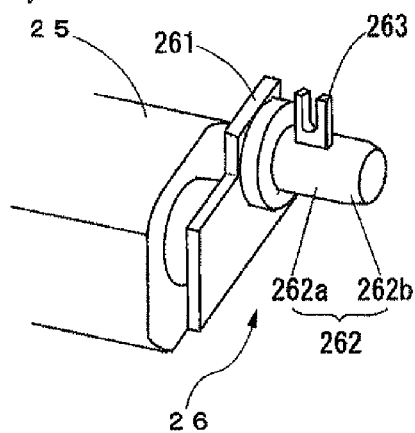

FIG. 6A is a perspective view showing a structure of a dual-arm robot 20, and FIG. 6B is a detail view of a holder 26.

A rotating body 21b of the dual-arm robot 20 is positioned above a fixed body 21a on an extension of the line connecting the drive roll 31 and the support roll 33. One end of the first arm 22R is attached to the right side of the rotating body 21b, and one end of the second arm 22L to the left side thereof. That is, the first arm 22R is located on the right side of the core 3, and the second arm 22L on the left side thereof. It is to be noted here that the first arm 22R and the second arm 22L may be mounted on separate bodies instead.

The first and second arms 22R, 22L include each a first movable member 23 rotatably connected to the rotating body 21b, a second movable member 24 rotatably connected to the first movable member 23, and a holding member 25 rotatably connected to the second movable member 24. Provided on the side of the holding member 25 further from the second movable member 24 is the holder 26 for holding the reel 2.

One end of the first movable member 23 is attached to the body 21 by means of a rotation mechanism 27a. As the rotation mechanism 27a, a stepping motor, an AC servo motor, or the like may be used. In such an application, the motor body may be fixed to the rotating body 21b, and the output shaft of the motor to the first movable member 23 such that the rotation mechanism 27a can rotate the first movable member 23 relative to the rotating body 21b. In the present embodiment, the arrangement is such that two motors are used to enable the rotation of the first movable member 23 in both the horizontal and vertical planes.

The second movable member 24 is attached to the first movable member 23 by means of a rotation mechanism 27b, which is identical to the rotation mechanism 27a. Also, the holding member 25 is attached to the second movable member 24 by means of a rotation mechanism 27c, which is identical to the rotation mechanism 27a.

The holder 26 includes an attachment member 261, a holding bar 262, and a core retaining member 263.

The attachment member 261 is a flat plate to be attached to the end portion of the holding member 25 further from the second movable member 24, and the holding bar 262 is attached to the attachment member 26 in such a manner as to protrude therefrom.

The holding bar 262 is a cylindrical member which is to be inserted into the interior of the shaft member 2d of the reel 2. The external diameter of the insertion part 262a, which is the body of the holding bar 262, is approximately equal to the internal diameter of the shaft member 2d, and the external diameter of the end portion 262b is smaller than the external diameter of the insertion part 262a. As such, it is possible that the holding bar 262 is inserted smoothly into the inside of the shaft member 2d and thus the shaft member 2d, which is the part securing the reel 2, is held properly with the insertion part 262a of the holding bar 262 inserted in the interior of the shaft member 2d.

The core retaining member 263 is disposed in such a manner as to protrude upward from the periphery of the holding bar 262. It is a member having a recess in the middle portion for retaining the core 3, which is U-shaped as seen in the forward-backward direction. The core retaining member 263 is used when a core 3 is moved and set on the core rotating unit and when a cable bead, which is the core wound with a wire, is returned to the carriage 40.

Note that the shifting of the reel 2 from one arm to the other may be done as follows. First one of the arms is moved closer to the core 3 in the axial direction of the reel 2, thereby inserting the holding bar 262 thereof into the interior of the shaft member 2d, and then the other of the arms is moved away from the core 3 in the axial direction of the reel 2, thereby pulling out the holding bar 262 thereof from the shaft member 2d.

As shown in FIG. 2, the drive roll 31, the holddown roll 32, the support roll 33, and the drive unit 34, which constitute the core rotating unit, are installed on a guide member 352, configured to slide along guide rails 351, which together constitute the core slide unit. More specifically, the support roll 33 is disposed on the backward side of the guide member 352, and the drive roll 31 and the drive unit 34 on the forward side thereof. The drive unit 34 may, for instance, be constituted by a motor with a speed changer. The core 3 can be rotated in a circumferential direction by rotating the drive roll 31 with a driving belt 34b coupling the output shaft of the motor with the rotating shaft of the drive roll 31, for instance.

The holddown roll 32 is mounted on a holddown roll support stand 352k which may be installed upright behind the drive unit 34. The holddown roll support stand 352k has a vertical member 352p, a lifting and lowering unit 352q provided on a side face of the vertical member 352p, and a horizontal member 352r attached to the lifting and lowering unit 352q and protruding backward. And the holddown roll 32 is mounted on the backward end of the horizontal member 352r.

The drive roll 31 and the support roll 33 are spaced apart from each other at a distance smaller than the diameter of the core 3. In the present embodiment, the drive roll 31, holddown roll 32, and support roll 33 used are all V-shaped rolls, and the use of the vertically movable holddown roll 32 as described above permits any of a plurality of cores with different diameters to be on the core rotating unit.

The core slide unit 35 includes guide rails 351, which are mounted on the base 38 in such a manner as to extend in a forward-backward direction, a guide member 352, which slides along the guide rails 351, and a slide mechanism 353, which causes the guide member 352 to slide on the guide rails 351. In the present embodiment, a ball screw is used for the slide mechanism 353, but any other well-known slide mechanism, such as a rack-and-pinion mechanism, may be used as well. Of the ball screw 353a, one end of the external thread is fixed to the guide rails 351 and the other end thereof is attached to the motor 353b, whereas the internal thread thereof is fixed to the guide rail 351 side of the guide member 352.

The winding position detecting sensor 36 is attached to the sensor support member 38a which is installed upright on the right side of the base 38. As the winding position detecting sensor 36, a camera unit for capturing the position of the wire 1 led out from the core 3 and a position detecting sensor capable of identifying the position of the wire 1 led out from the core 3 by performing an image processing on the captured image may be used, for instance.

The illuminator 37, which is attached to the illuminator support member 38b installed upright on the left side of the base 38, illuminates the neighborhood of the position of the wire 1 led out from the core 3.

A description will now be given of a method for manufacturing a cable bead.

First a worker sets a core 3 and a reel 2 on an empty carriage 40 on a supply stand 50 in the standby region R1. More specifically, the worker places the lower part of the core 3 on the two support rollers 41, 41 and the reel 2 on the reel support base 42 and then leads out a wire 1 from the reel 2 and secures the end of the wire 1 to the core 3.

Following this, the worker moves the carriage 40 from the standby region R1 into the fetching region R2 by pushing the handle 45b provided at the rear in the advance direction of the carriage 40. With the sliding member 43 of the carriage 40 provided with wheels 44, the worker can move the carriage 40 smoothly along the rails 52 to the fetching region R2.

With the carriage 40 entering the fetching region R2, the rotating body 21b of the dual-arm robot 20 is rotated such that the first and second arms 22R, 22L face the carriage 40. Then, as shown in FIG. 5A, the holding bar 262 provided on the holder 26 of the holding member 26 of the first arm 22R or the second arm 22L is positioned in the rear of the handle 45a, which is provided at the front in the advance direction. Then the carriage 40 is moved to the fetching position, which is the foremost position of the rails, by sliding the sliding member 43 toward the rotating body 21b. The arrangement may also be such that the carriage 40 is moved to the fetching region R2 in advance before operating the dual-arm robot 20.

The dual-arm robot 20 holds the reel 2 and the core 3 at the fetching position.

Figure 7A:
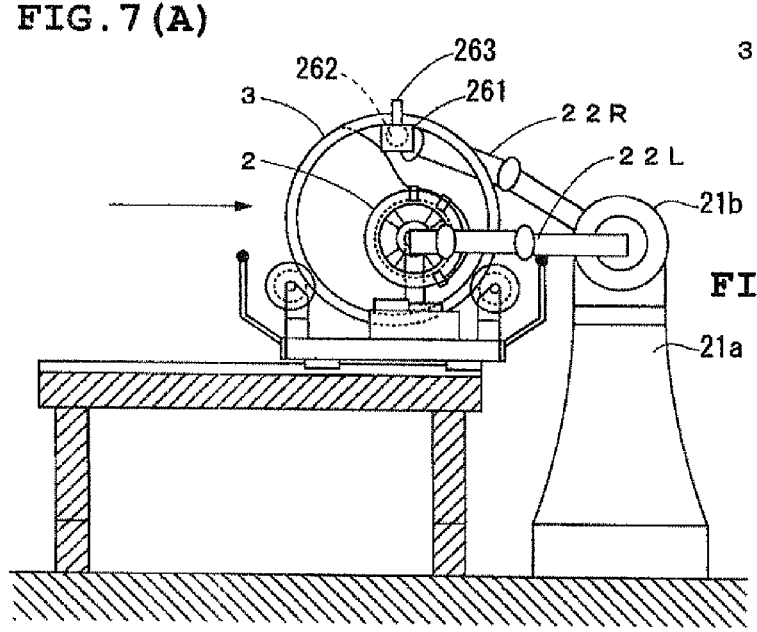
FIGS. 7(A), 7(B), and 7(C) are illustrations for explaining the holding operations by a reel revolving unit.
Figure 7B:
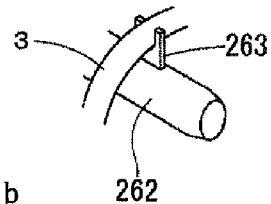
Figure 7C:
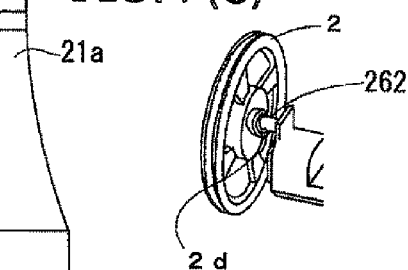

More specifically, as shown in FIGS. 7A to 7C, the holding bar 262 provided on the holder 26 of the second arm 22L is inserted into the interior of the shaft member 2d until the insertion part 262a thereof is inside the shaft member 2d, thereby securely holding the shaft member 2d. On the other hand, the holding bar 262 of the first arm 22R is located inside the ring of the core 3, and the core 3 is inserted on the inner perimeter side and then moved upward. As a result, the core 3 can be held by the first arm 22R, with the upper portion of the core 3 inserted in the recess in the core retaining member 263 protruding from the outer periphery of the holding bar 262.

Then the first and second arms 22R, 22L are returned to the side of the core moving unit 30 by the rotation of the rotating body 21b. Now the core 3 held by the first arm 22R is placed on the drive roll 31 and the support roll 33, and then the holddown roll 32 is lowered until it touches the upper portion of the core 3. Thus the core 3 is held by the three rolls 31 to 33 in a vertical plane. On the other hand, the reel 2 is held by the second arm 22L on the left side of the core 3. That is, the reel 2 held by the second arm 22L from the left side of the reel 2, which is the side further from the core 3, is located on the left side of the core 3. More specifically, the reel 2 is located at a predetermined position within the inside of a virtual cylinder axially extending from the ring of the core 3 (hereinafter referred to as the "inside of the core"). The predetermined position, which is the starting point of the swing (revolving) motion of the reel 2, is an innermost point of the core 3, so that this position will hereinafter be referred to as the innermost position of the reel. It is to be noted also that the reel 2 is held by the second arm 22L such that the axial (right-left) direction of the reel 2 is in parallel with the axial (right-left) direction of the core 3.

Figure 8:
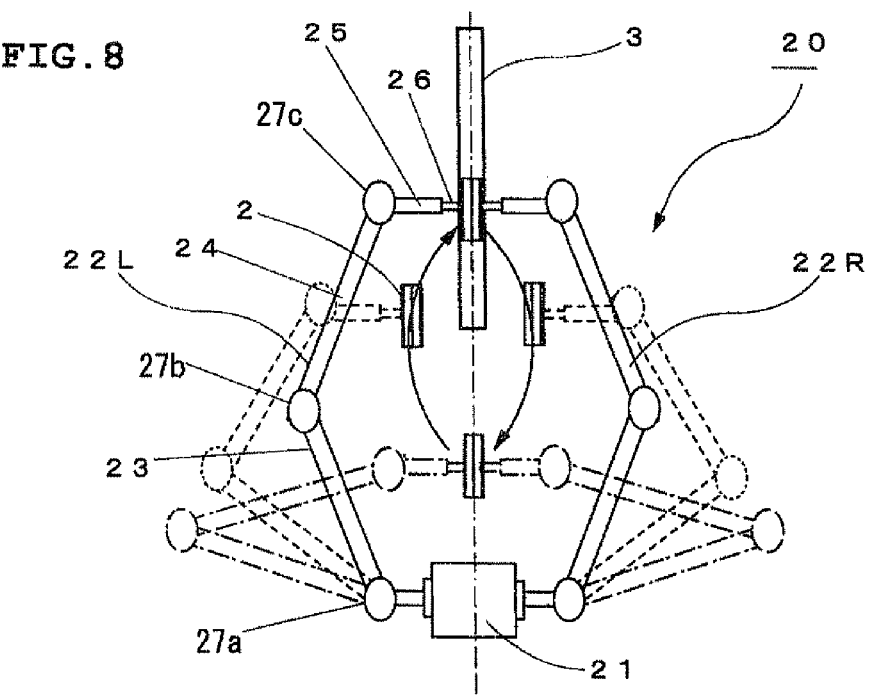
FIG. 8 is an illustration for explaining the swing operations by a reel revolving unit.

Next, as shown in FIG. 8, the reel 2 is swung from the inside to the outside of the core 3 by changing the extension directions of the first movable member 23, the second movable member 24, and the holding member 25 by the use of the respective rotation mechanisms 27a to 27c of the second arm 22L.

Note that a cable bead is manufactured by wrapping the core with alternate layers of S-winding and Z-winding of a wire, for instance. Hereinbelow, a description is given of an S-winding operation.

Figures 9A, 9B, 9C, 9D:
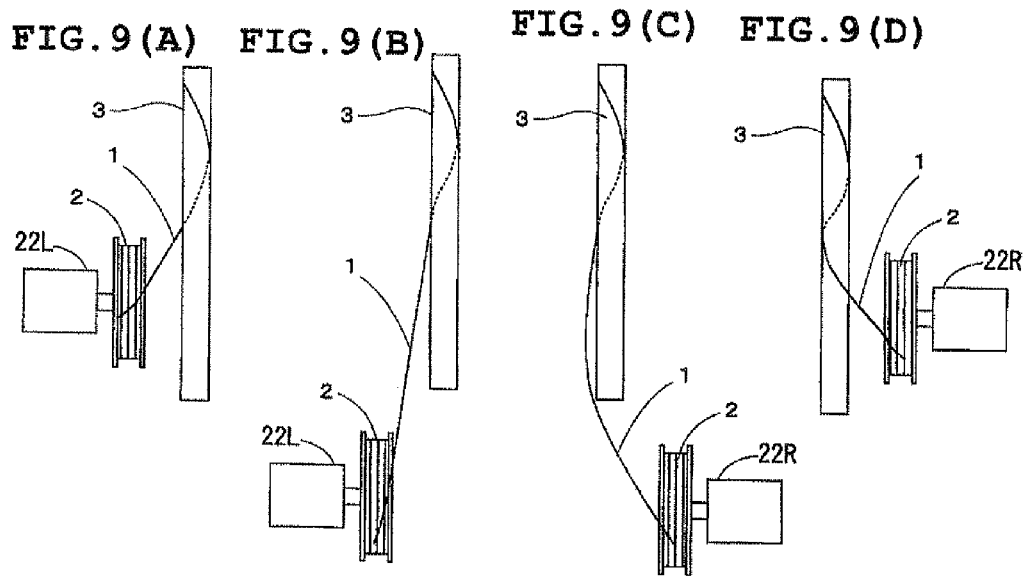
FIGS. 9(A), 9(B), 9(C), and 9(D) are illustrations for explaining the winding of a wire.

As shown in FIG. 9A, the reel 2 is held by the second arm 22L on the left side of the core 3.

Next, as shown in FIG. 9B, the reel 2 is swung on the left side of the core 3 from the inside to the outside thereof as the second arm 22L is contracted by changing the extension directions of the first movable member 23, the second movable member 24, and the holding member 25 by the use of the respective rotation mechanisms 27a to 27c of the second arm 22L.

The wire 1, which is secured to the winding point of the core 3, is led out from the reel 2. At this time, if the core 3 is moved front in the direction further from the reel 2 by moving the guide member 352 forward with the operation of the slide mechanism 353 of the core slide unit 35, then the lead-out speed of the wire 1 will be faster because the relative speed in the forward-backward direction of the reel 2 relative to the core 3 will be greater.

In the present embodiment, the lead-out position of the wire 1 is stabilized by wire guides 2g which are provided on the reel 2 so as to restrict the lateral position of the wire 1 being led out. Also, the reel 2 has a braking mechanism built therein, which ensures that an optimum tension is applied to the wire 1 as it is led out from the reel 2.

At the point when the reel 2 is swung to the left outside position of the core 3, the side for holding the reel 2 is switched. More specifically, the holding bar 262 of the first arm 22R, which is located on the right side, is inserted into the interior of the shaft member 2d of the reel 2, and then the holding bar 262 of the second arm 22L, which is located on the left side, is pulled out from the shaft member 2d of the reel 2. Thus, as shown in FIG. 9C, the side for holding the reel 2 is switched from the left side to the right side. At this hold switching position, the reel 2 is located at an outermost point outside the core 3, so that this position will hereinafter be referred to as the outermost position of the reel.

Next, as shown in FIG. 9D, the reel 2 is swung on the right side of the core 3 from the outside to the inside thereof as the first arm 22R is extended by changing the extension directions of the first movable member 23, the second movable member 24, and the holding member 25 by the use of the respective rotation mechanisms 27a to 27c of the first arm 22R. At the same time, the core 3 is rotated in a circumferential direction as the drive roll 31 is rotated by operating the drive unit 34. As a result, the wire 1 is moved from the left side to the right side of the core 3, so that it is wound around the core 3.

At this time, if the core 3 is moved backward in the direction closer to the reel 2 (the direction of the outermost position of the reel seen from the innermost position) by moving the guide member 352 frontward with the operation of the slide mechanism 353 of the core slide unit 35, then the winding speed of the wire 1 will be faster because the relative speed in the forward-backward direction of the reel 2 relative to the core 3 will be greater.

In the present embodiment, an illuminator 37 illuminates the winding position where the wire 1 is led out from the core 3. At the same time, the actual winding position is detected by the winding position detecting sensor 36 when the reel 2 is moved to the inside of the core 3, and based on the result of the detection, the circumferential position of the core 3 is adjusted. Thus the rotational position of the winding point of the wire can be adjusted, so that the wire can be accurately aligned with the target position on the core.

Next, when the reel 2 is swung to the innermost position on the right side of the core 3, the side for holding the reel 2 is switched. At the point when the side for holding the reel 2 is switched from the right side to the left side, the reel 2 is back at the initial position, and the wire 1 has been wound around the core 3 by one turn.

Figure 10:
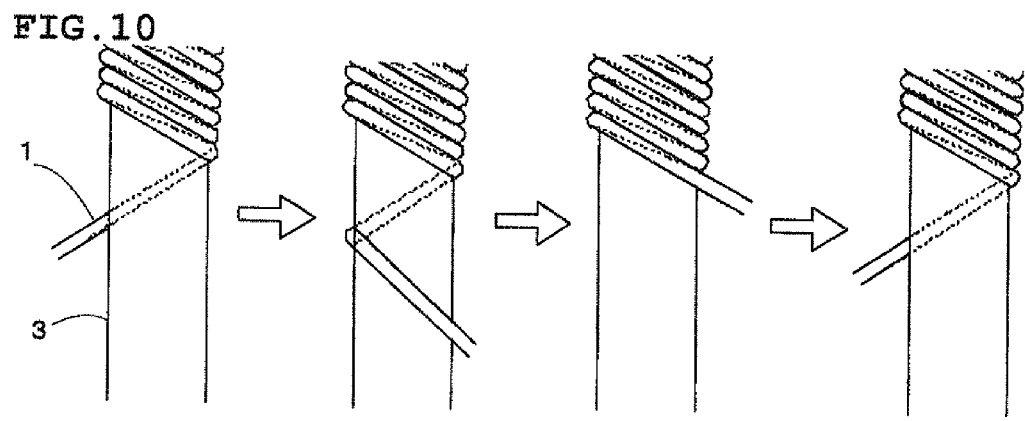
FIG. 10 is illustrations showing states of a wire being wound.

By the repetition of these processes of revolving the reel around the core 3, the wire 1 can be wound helically (spirally) around the core 3 as shown in FIG. 10.

For a Z-winding, the reel 2 should be held by the first arm 22R first, and the wire 1 should be led out to the right side of the core 3.

On completion of a winding, the revolution of the reel 2 and the rotation of the core 3 are stopped. Now using a not-shown temporary securing means, the wire 1 is cut and the end of the wire 1 on the core 3 side is temporarily secured to the core 3 by means of a joining ring or the like. Then the manufactured cable bead and the reel 2 are returned to the carriage 40.

More specifically, when the reel 2 after the winding is being held by the second arm 22L, the cable bead may be held by inserting it in the recess in the core retaining member 263 of the holder 26 of the first arm 22R, which is now empty-handed. Then the first and second arms 22R, 22L are turned to face the carriage 40 by the rotation of the rotating body 21b of the dual-arm robot 20. Now the cable bead is placed on the support rollers 41, 41 of the carriage 40, and the reel 2 is returned to the reel support base 42.

Then the dual-arm robot 20 moves the carriage 40, which has been at the fetching position, from the fetching region R2 to the standby region R1 by pushing the handle 45a with the holding bar 262 of the holder 26, before it starts the action of drawing another carriage 40 closer for the manufacturing of the next cable bead.

The worker in the standby region R1 pulls the carriage 40 carrying the cable bead and the reel 2 after the winding closer and recovers the cable bead and the reel 2 after the winding.

In the description of the foregoing embodiments, the division of the operation area has been into the standby region R1 and the fetching region. R2. However, as shown in FIG. 11, a preparation region R0 may be provided before the standby region R1. And in the preparation region R0, the worker may perform the operation of leading out the wire 1 from the reel 2 and securing the end of the wire 1 to the core 3. This will improve safety because there is a clear division between the operation areas of the worker and the dual-arm robot 20.

Also, safety may be further improved by setting up a safety fence between the standby region R1 and the fetching region R2 or by emitting an alarm sound upon detection by a laser scanner of entry of the worker in the fetching region R2.

As described above, the present invention assures easy and efficient manufacture of cable beads which display excellent wire winding. It also improves the productivity of cable beads because it allows easy replacement of annular cores and reels of wire which are to be supplied to the system.

In the foregoing specification, the invention has been described with reference to specific embodiments thereof. However, the technical scope of this invention is not to be considered as limited to those embodiments. It will be evident to those skilled in the art that various modifications and changes may be made thereto without departing from the broader spirit and scope of the invention. It will also be evident from the scope of the appended claims that all such modifications are intended to be included within the technical scope of this invention.

What is claimed is:

1. A method for manufacturing a cable bead, comprising the steps of:
    arranging a plurality of carriages, each carrying an annular core and a reel wound with a wire, around a reel revolving unit, the reel revolving unit configured to revolve the reel with two arms thereof;
    holding the core with one of the arms and setting the core on a core rotating unit, the core rotating unit disposed near the reel revolving unit to rotate the core in a circumferential direction, and holding the reel with the other of the arms and positioning the reel on one side of the core set on the core rotating unit;
    manufacturing a cable bead by winding the wire helically around the core, with the reel revolved as the reel is held alternately by each of the two arms and the core rotated circumferentially in association with the revolution of the reel; and
    holding the manufactured cable bead with an arm not holding the reel and returning the cable bead and the reel to the carriage.

2. A system for manufacturing a cable bead, comprising:
    a plurality of carriages, each carrying an annular core and a reel wound with a wire; and
    a cable bead manufacturing apparatus for manufacturing a cable bead by winding the wire helically around the core, with the core rotated circumferentially in association with the revolution of the reel, the apparatus including:
    a core rotating unit for rotating the core in a circumferential direction, and
    a reel revolving unit for revolving the reel through the inside and the outside of the core set on the core rotating unit by holding the reel alternately on one side and the other side of the core,
    wherein the plurality of carriages are arranged in a radial manner around the reel revolving unit, and
    wherein the reel revolving unit includes a first arm disposed on one side of the core to hold the reel on a side thereof further from the core plane and swing the reel to the other side of the core and a second arm disposed on the other side of the core to hold the reel on a side thereof further from the core plane and swing the reel to the one side of the core, each of the arms including a body, a first movable member rotatably connected to the body, a second movable member rotatably connected to the first movable member, and a holding member rotatably connected to the second movable member to hold the reel.

3. The system for manufacturing a cable bead according to claim 2, wherein the body has a fixed part and a rotating part rotatably mounted on the fixed mounted on the fixed part, the rotating part having the first movable member connected thereto.

4. The system for manufacturing a cable bead according to claim 2, further comprising rails for moving the carriages.

5. The system for manufacturing a cable bead according to claim 2, wherein the carriages are each provided with a handle to be held by a holding member of the reel revolving unit.

* * * * *